United States Patent [19]

Arai et al.

[11] Patent Number: 5,314,269
[45] Date of Patent: May 24, 1994

[54] CUTTING INSERT AND CUTTER

[75] Inventors: Tatsuo Arai; Takayoshi Saito; Hiroaki Hayashizaki, all of Ibaraki, Japan

[73] Assignee: Mitsubishi Materials Corporation, Tokyo, Japan

[21] Appl. No.: 940,289

[22] Filed: Sep. 3, 1992

[30] Foreign Application Priority Data

Sep. 5, 1991 [JP] Japan ................... 3-226232

[51] Int. Cl.⁵ .............................................. B26D 1/12
[52] U.S. Cl. .................................. 407/42; 407/113; 407/56; 407/58
[58] Field of Search ............. 407/113, 114, 42, 40, 407/48, 51, 60, 61, 58

[56] References Cited

U.S. PATENT DOCUMENTS

| | | | |
|---|---|---|---|
| 830,778 | 9/1906 | Geer | 407/58 |
| 2,322,578 | 6/1943 | Kutscha | 407/40 |
| 3,576,200 | 4/1971 | Elmes | 407/60 |
| 3,940,835 | 3/1976 | Friedline et al. | 407/113 |
| 4,090,801 | 5/1978 | Faber | 407/113 |
| 4,616,962 | 10/1986 | Ushijima et al. | 407/113 |
| 4,645,384 | 2/1987 | Shimomura et al. | 407/42 |
| 4,681,488 | 7/1987 | Markusson | 407/114 |
| 4,934,880 | 6/1990 | Stashko | 407/42 |
| 5,007,775 | 4/1991 | Pantzar | 407/114 |
| 5,020,944 | 6/1991 | Pawlik | 407/113 |
| 5,090,845 | 2/1992 | Bentjens | 407/58 |
| 5,145,295 | 9/1992 | Satran | 407/113 |

FOREIGN PATENT DOCUMENTS

| | | | |
|---|---|---|---|
| 104517 | 4/1984 | European Pat. Off. | 407/40 |
| 2805670 | 8/1978 | Fed. Rep. of Germany | 407/113 |
| 589034 | 5/1925 | France | 407/40 |
| 53-101792 | 9/1978 | Japan | |

Primary Examiner—Bruce M. Kisliuk
Assistant Examiner—Bryan Reichenbach
Attorney, Agent, or Firm—Cushman, Darby & Cushman

[57] ABSTRACT

A cutting insert is disclosed which includes a polygonal plate-shaped insert body having two opposite faces directed in the direction of insert thickness and a plurality of peripheral faces lying between the opposite faces. The opposite faces have marginal edges with at least one of the marginal edges defining a main cutting edge. The peripheral faces intersect one another to form marginal edges with one of the marginal edges defining an auxiliary cutting edge which intersects the main cutting edge. The peripheral surface which includes the marginal edges defining the main and auxiliary cutting edges includes a rake region extending along the main and auxiliary cutting edge. This rake region is formed into a stepped formation of a plurality of sections disposed adjacent to one another to define marginal edges terminating at one ends at the main cutting edge and to be convexly shaped in such a manner that an angle defined between a respective section and one of the opposite faces which extends from the main cutting edge decreases stepwise in a direction away from the nose portion. At least one of the marginal edges of the sections has the other end extending to the marginal edge defined between the peripheral faces. Moreover, an insert cutter which employs the aforesaid insert is also disclosed.

8 Claims, 11 Drawing Sheets

CUTTING INSERT AND CUTTER

BACKGROUND OF THE INVENTION

1. Field of the Invention

The present invention relates to a cutting insert releasably attached to a tool body of a cutting tool such as a face milling cutter, and in particular to an insert which is secured to the tool body such that one of the opposite faces facing in the direction of the insert thickness is directed radially outwardly with respect to the tool body. The present invention also relates to an insert cutter employing the above cutting insert.

2. Prior Art

Figure 16:
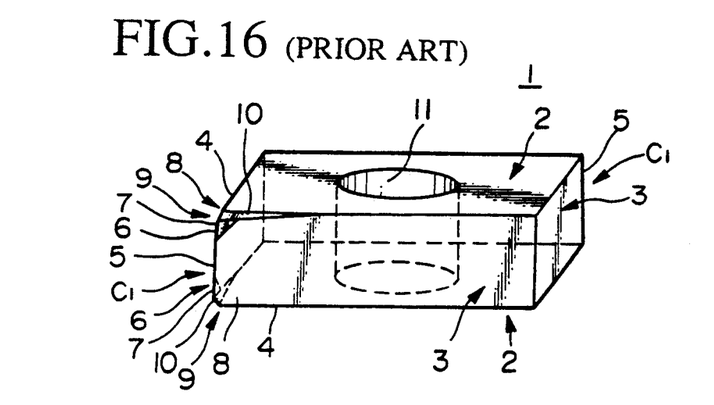
FIG. 16 is a perspective view of a conventional cutting insert.
Figure 17:
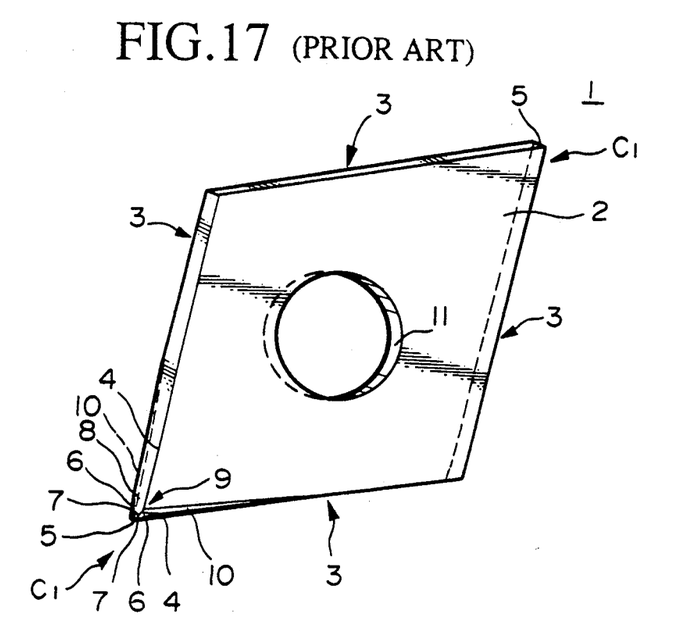
FIG. 17 is a plan view of the insert of FIG. 16, as seen from a face 2.
Figure 18:
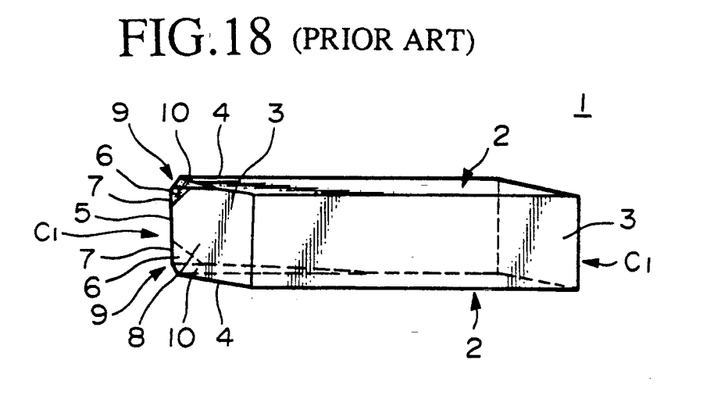
FIG. 18 is a side-elevational view of the insert of FIG. 16, as seen from a peripheral face 3.

In cutting tools such as a face milling cutter, a so-called vertical insertion type is hitherto known in which a polygonal plate-like insert is secured to a tool body such that one of the opposite faces directed in the direction of the insert thickness is directed radially outwardly with respect to the tool body. FIGS. 16 to 18 depict a prior art cutting insert for use in the cutting tools of this kind. This insert is disclosed in Japanese Patent Application, Laid-Open No. 53-101792, and comprises an insert body 1 formed by molding a hard material such as cemented carbide into a rhombic plate-like shape. The insert body 1 is defined by opposite front and rear faces 2 and 2 directed in the direction of the insert thickness and four peripheral faces 3 lying between the opposite faces 2 and 2 so as to extend perpendicular to the faces 2 and 2. Among marginal ridges of the two opposite faces 2 and 2, four marginal edge which are alternately disposed at the opposite faces 2 and 2, in a staggered relation to one another, define main cutting edges 4, respectively.

Furthermore, the corner portion of the peripheral face 3, into which a marginal edge 5, defined by the two adjacent peripheral faces 3 and 3 of the insert body 1 and located at a respective acute corner portion C1 of the insert body 1, and a marginal edge of the front or rear face 2, defining no main cutting edge, merge, defines an inclined surface 6 having a width increasing toward the aforesaid marginal edge 5. The marginal edge of the inclined surface 6 which serves as a portion of the marginal edge 5 defines an auxiliary cutting edge 7 which intersects the main cutting edge 4 so as to form an obtuse angle therebetween. In addition, a rake surface 8 extending along the main and auxiliary cutting edges 4 and 7, is formed on the peripheral face 3 which has as its marginal edges both the marginal edge 5 defining the main cutting edge 4 and the marginal edge defining the auxiliary cutting edge 7.

Furthermore, in FIGS. 16 to 18, the numeral 9 denotes a nose portion formed at a portion into which the main cutting edge 4 and the auxiliary cutting edge 7 merge, and the numeral 10 denotes a chamfered portion formed on the marginal edge which does not serve as the main cutting edge 4. In addition, the numeral 11 denotes a mounting aperture for releasably mounting the insert body 11 to a cutting tool such as a face milling cutter.

Figure 19:
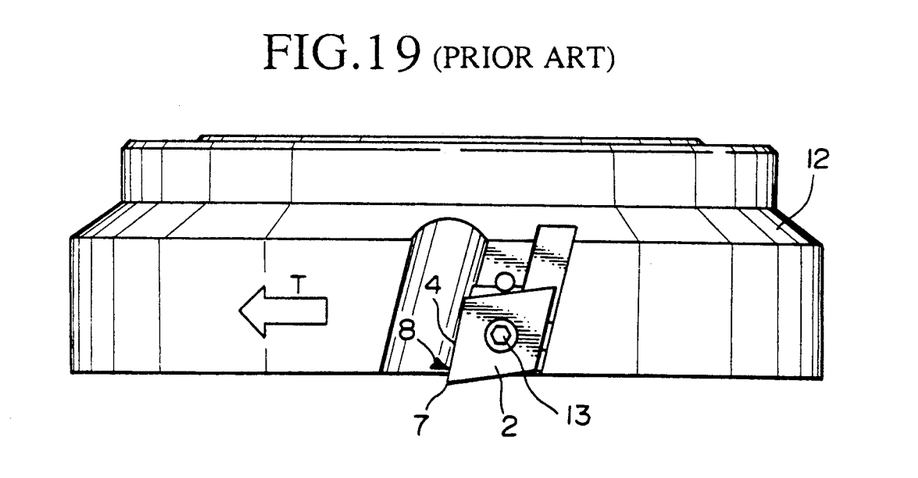
FIG. 19 is a side-elevational view of a face milling cutter to which the prior art insert of FIG. 16 is attached.

In a face milling cutter as shown for example in FIG. 19, the prior art cutting insert constructed as described above is secured to an outer periphery of a tool body 12 by means of a clamp screw 13, in such a manner that one of the opposite faces 2 and 2 is directed in a radially outward direction with respect to the tool body 12, and that one of the main cutting edges 4 formed on the marginal edges of one face 2 is indexed so as to protrude from the outer peripheral surface of the tool body while the auxiliary cutting edge 7 extending continuously from the indexed main cutting edge 4 is indexed so as to protrude from the forward end face of the tool body. As shown in FIG. 19, the rake surface 8 extending along the indexed main and auxiliary cutting edges 4 and 7 is directed in the direction of rotation T of the tool body 12, and in particular with regard to the indexed main cutting edge 4, the rake surface is a negative rake surface which intersects the front face 2 so as to form a 90° angle therebetween. Furthermore, the one face 2 extending from the indexed main cutting edge 4 serves as a flank surface for the main cutting edge 4, whereas the inclined surface 6 formed on the peripheral face 3, which is directed in a forward direction with respect to the tool body 12, serves as a flank surface for the indexed auxiliary cutting edge 7.

Moreover, with the above construction, the aforesaid prior art insert may be used four times by rotating it 180° or by turning it over causing unused cutting edges to be indexed.

In the cutting insert as described above, it is well known that in order to improve cutting performance, cutting load to be exerted on the main cutting edge 4 must be reduced, and thus accordingly the axial and radial rake angles for the indexed main cutting edge 4 should be increased in their positive directions.

However, in the prior art insert as described above, the peripheral face 3, on which the rake surface for the indexed main cutting edge 4 is formed, is formed as a single planar surface, perpendicular to the face 2 over the entire length of the main cutting edge 4. As a result, in order to increase the axial rake angle for the main cutting edge 4 while ensuring a sufficient relief angle for the auxiliary cutting edge 7, the apex angle at the acute corner portion C1 of the insert body 1 (i.e., the angle defined between the peripheral faces 3 and 3 intersecting each other at the acute corner portion C1) must be made small. However, if the insert is formed in a more oblate rhombic shape, the included angle of the auxiliary cutting edge 7 at the acute corner portion C1 becomes unduly small. Therefore, the strength of the cutting edge is decreased and the cutting edge becomes susceptible to chipping.

In addition, a positive cutting insert in which a rake surface extending along the main cutting edge is formed so as to intersect one of opposite faces at an acute angle formed therebetween in order to increase the radial rake angle for the main cutting edge, is also known. However, in such a positive cutting insert, since the included angle of the main cutting edge is small, the possibility of chipping due to the reduction of the strength at the tip end of the cutting edge cannot be avoided.

In particular, when a cutting insert is employed for the face milling cutter as described above, the cutting edge which protrudes axially forwardly with respect to the tool body, will be subjected to the largest load during the cutting operation, and therefore the problems regarding the chipping of the cutting edge are very serious.

SUMMARY OF THE INVENTION

It is therefore an object and feature of the present invention to provide a cutting insert which does not possess the aforesaid disadvantages, and exhibits excellent cutting performance while ensuring a sufficient strength at the cutting edges.

Another object and feature of the invention is to provide an insert cutter which employs the aforesaid insert.

According to a first aspect of the present invention, there is provided a cutting insert comprising a polygonal plate-like insert body including two opposite faces directed in a direction of thickness of the insert and a plurality of peripheral faces lying between the opposite faces, the opposite faces having marginal edges with at least one of the marginal edges defining a main cutting edge, the peripheral faces intersecting one another to form marginal edges with at least one of the marginal edges defining an auxiliary cutting edge which intersects the main cutting edge; the peripheral surface which includes the marginal edges defining the main and auxiliary cutting edges including a rake region extending along the main and auxiliary cutting edge, the insert body having a nose portion into which the main cutting edge and the auxiliary cutting edge merge;

the rake region being formed into a stepped form of a plurality of sections disposed adjacent to one another to define marginal edges terminating at one end at the main cutting edge and to be convexly shaped in such a manner that an included angle defined between a respective section and one of the opposite faces which extends from the main cutting edge decreases stepwise in a direction away from the nose portion, at least one of the marginal edges of the sections having the other end extending to the marginal edge defined between the peripheral faces.

According to another aspect of the present invention, there is provided an insert cutter comprising:

a tool body having an axis of rotation therethrough; and a cutting insert including a polygonal plate-like insert body having two opposite faces directed in a direction of insert thickness and a plurality of peripheral faces lying between the opposite faces, the insert being releasably attached to the tool body so that the opposite faces are directed radially of the tool body, the opposite faces having marginal edges with at least one of the marginal edges defining a main cutting edge, the peripheral faces intersecting one another to form marginal edges with at least one of the marginal edges defining an auxiliary cutting edge which intersects the main cutting edge, the peripheral surface which includes the marginal edges defining the main and auxiliary cutting edges including a rake region extending along the main and auxiliary cutting edge, the insert body having a nose portion into which the main cutting edge and the auxiliary cutting edge merge, the rake region being formed into a step-like formation of a plurality of sections disposed adjacent to one another to define marginal edges terminating at one end at the main cutting edge and to be convexly shaped in such a manner that an angle defined between a respective section and one of the opposite faces which extends from the main cutting edge decreases stepwise in a direction away from the nose portion, at least one of the marginal edges of the sections having the other end extending to the marginal edge defined between the peripheral faces.

In the cutting insert thus constructed, the rake region, which is formed on the peripheral face of the insert body so as to extend along both of the main cutting edge and the auxiliary cutting edge, is formed by a plurality of sections which are convexly bent in a stepwise manner along the periphery of the insert body. Therefore, when the cutting insert is attached to a cutting tool such as a face milling cutter in such a manner that the rake region is directed in a direction of rotation of the tool body, the axial rake angle for the rake region is increased stepwise in its positive side in a direction from the section located at the forward side of the tool body toward the section located at the rearward side. Furthermore, these sections are formed such that the angle, defined by the section and the front or rear face on which the main cutting edge is formed, decreases stepwise in a direction away from the nose portion into which the main cutting edge and the auxiliary cutting edge merge. As a result, when the insert is attached to the tool body, the radial rake angle for the rake region is also increased stepwise in a direction from the forward end portion of the tool body toward the rearward portion thereof.

Thus, particularly at the forward end portion of the tool body on which an excessively large load is exerted during the cutting operation, the axial rake angle and the radial rake angle are both small, and hence the included angles for the main cutting edge and the auxiliary cutting edge are both increased, so that a sufficient strength at the cutting edges can be ensured. Furthermore, at the rearward end of the tool body, the axial and radial rake angles for the main cutting edge are set so as to be large in the positive direction. Therefore, the reduction of the cutting load can be achieved, thereby improving the cutting performance.

DESCRIPTION OF THE PREFERRED EMBODIMENTS OF THE INVENTION

FIGS. 1 to 8 depict a cutting insert in accordance with a preferred embodiment of the present invention, which comprises an insert body 21 formed by molding a hard material such as cemented carbide into a generally rhombic plate-like shape. The insert body 21 is defined by two opposite front and rear faces 22 and 22 directed in a direction of the insert thickness and four peripheral surfaces 23 lying between the opposite faces 22 and 22.

Among eight marginal edges of the two faces 22 and 22, four marginal edges, disposed alternately at the opposite two faces in a staggered relation to one another, define main cutting edges 24, respectively.

Furthermore, each of the marginal edges defined by the adjacent peripheral faces 23 and 23 intersecting each other so as to form an acute angle therebetween (i.e., each of the marginal edges 25 of the peripheral faces located at acute corners C11 and C11 of the insert body 21) defines a pair of auxiliary cutting edges 27, each of which intersects a respective main cutting edge 24 formed on the faces 22 and extends from the main cutting edge 24 in the direction of the insert thickness away therefrom. Furthermore, a rake region 28 is formed on each of the peripheral faces 23 and 23 which intersect each other to define the marginal edges 25 at the acute corner portions, such that it extends along the corresponding main and auxiliary cutting edges 24 and 27.

Moreover, in the present embodiment, each of the rake regions 28 is formed so as to be convexly bent into stepped (in the illustrated embodiment, three-stepped) planes or sections which are arranged in a circumferential direction of the insert body 21, such that each intersection into which the adjacent sections merge extends to and intersects the main cutting edge 24. With this construction, the main cutting edge 24 is divided into three sections: a first cutting edge portion 24A disposed adjacent to a nose portion 29, a second main cutting edge portion 24B disposed adjacent to the first cutting edge portion, and a third cutting edge portion 24C located at a position away from the nose portion 29. In other words, the main cutting edge is in the form of a convexly kinked line.

In the foregoing, the farther the position of the section is separated from the nose portion 29, the further the intersection angle $\theta$, defined between the face 22 extending from the main cutting edge 24 and the section of the rake region, decreases. In the illustrated embodiment, when the three sections of the rake region are referred to as a first section 28A, a second section 28B and a third section 28C starting from the nose portion 29, intersection angle $\theta_1$ defined between the face 22 and the first section 28A is set to 90° (see FIG. 5), and intersection angle $\theta_2$ defined between the face 22 and the second section 28B is set to 86.1° (not shown). Further, intersection angle $\theta_3$, defined between the face 22 and the third section 28C, is set to 83° (see FIG. 7). More specifically, the first section 28A is formed as a negative rake region perpendicular to the face 22, while the second and third sections 28B and 28C are formed as positive rake regions intersecting the face 22 at an acute angle formed therebetween.

Furthermore, if in the present embodiment, the marginal edge defined by the intersection of the first and second sections 28A and 28B is indicated by a first marginal edges $L_1$, and the marginal edge defined by the intersection of the second and third sections 28B and 28C is indicated by a second marginal edge $L_2$, the other end of the first marginal edge $L_1$ is extended to the marginal edge on which the auxiliary cutting edges 27 are formed. In addition, the other end of the second marginal edge $L_2$ is extended to the marginal edge of the peripheral face 23 opposite the marginal edge on which the main cutting edge 24 is formed, i.e., to the marginal edge of the face 22 opposite to the face 22 on which the corresponding main cutting edge 24 is formed.

In the foregoing, the other end of the first marginal edge $L_1$ is formed such that it intersects the marginal edge 25 at a position of about two thirds of the entire length of the marginal edge 25, i.e., the thickness of the insert, from the nose portion 29. Accordingly, the central portion of the marginal edge is defined by a marginal edge portion for both of the first sections 28A and 28A, which are formed as negative rake surfaces, so that the aforesaid central portion is formed perpendicular to both of the faces 22 and 22.

Moreover, in the present embodiment, the auxiliary cutting edge 27 is formed such that it extends inwardly of the insert in a direction of the insert thickness to the opposite ends of the central portion of the marginal edge 25. More specifically, in each of the rake regions 28 and 28 intersecting each other at the acute corner C11, the other end of the first marginal edge $L_1$ formed on one rake region 28 is formed so as to coincide with the inner end of the auxiliary cutting edge 27 in the direction of the insert thickness extending to the other rake region 28. In other words, the inner end of the auxiliary cutting edge 27 in the direction of the thickness of the insert is determined by the other end of the first marginal edge $L_1$ formed on the one rake surface 28. Accordingly, the auxiliary cutting edge 27 on the other rake region 28 is formed on the second section 28B of the one rake surface 28.

Furthermore, the inner end of the auxiliary cutting edge 27 in the direction of insert thickness, which extends from the one rake region 28, is determined by the other end of the first marginal edge $L_1$ formed on the other rake surface 28, whereby the auxiliary cutting edge 27 extending from the one rake region 28 is formed on the marginal edge of the second section 28B of the other rake region 28 of the marginal edge 25.

Furthermore, in the present embodiment, among eight marginal edges of the faces 22 and 22 of the insert body 21, the four main cutting edge on which the main cutting edges are not formed, i.e., the marginal ridges of the peripheral face opposite to the marginal edge defining the main cutting edge, are removed to provide chamfered portions 30 which intersect the face 22 and the peripheral face 23 at an obtuse angle formed therebetween such that it extends from the one end at the acute corner portions C11 towards the other end of the marginal edge.

In the foregoing, among the two peripheral faces 23 and 23 intersecting each other at the acute corner portion $C_{11}$, one of the chamfered portions 30 which is formed on the one peripheral face 23, is constructed such that the one end is continuous with the nose portion 29 of the main and auxiliary cutting edges 24 and 27, formed on the other peripheral face 23, and this portion 30 intersects the first section 28A of the rake region 28 formed on the other peripheral face 23. In contrast, the other chamfered portion 30, formed on the marginal edge of the other peripheral face 23, is constructed such that the one end is continuous with the nose portion 29 of the one peripheral face 23, and also intersects the first section 28A of the rake region 28 formed on the one peripheral face 23.

The aforesaid chamfered portions 30 are extended from the acute corner portion $C_{11}$ over the marginal portions of the second marginal edge $L_2$ to a position intermediate between the third section 28C of the rake region 28 formed on the peripheral face 23, and the marginal edge of the face 22. Furthermore, each of the chamfered portions 30 is formed such that its width gradually decreases in the direction from one end at the acute corner portion $C_{11}$ toward the other end of the third section 28C.

Furthermore, in the drawings, the numeral 31 denotes a mounting aperture formed through the insert body 21 and extending through the center of the insert in the direction of the thickness. A clamp screw is inserted therethrough when the insert is attached to a cutting tool such as a face milling cutter. The shape of the head portion of the clamp screw is formed so as to be reduced in size inwardly thereof in the direction of the insert thickness.

Figure 1:
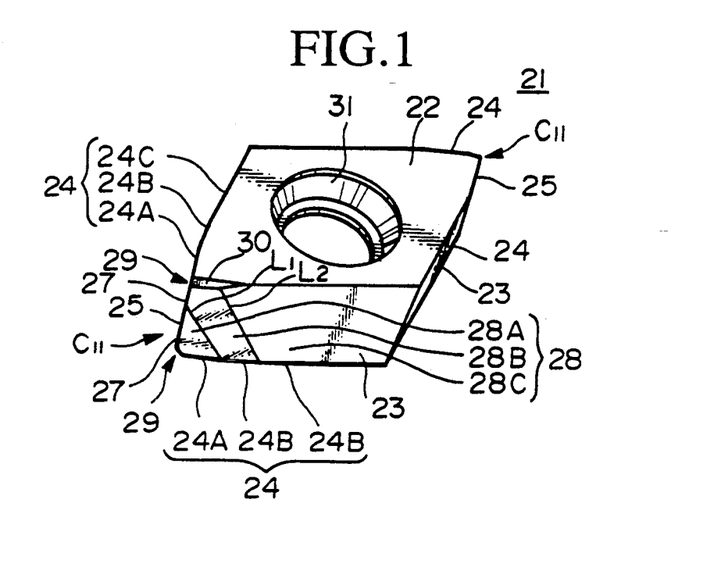
FIG. 1 is a perspective view of a cutting insert in accordance with an embodiment of the present invention.
Figure 2:
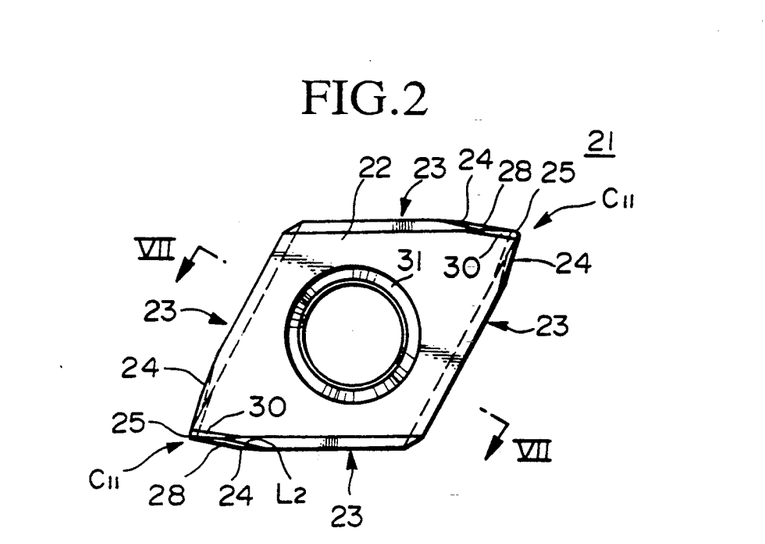
FIG. 2 is a plan view of the insert of FIG. 1 as seen in the direction of thickness of the insert, i.e., in the direction vertical to a front face 22 of the insert.
Figure 3:
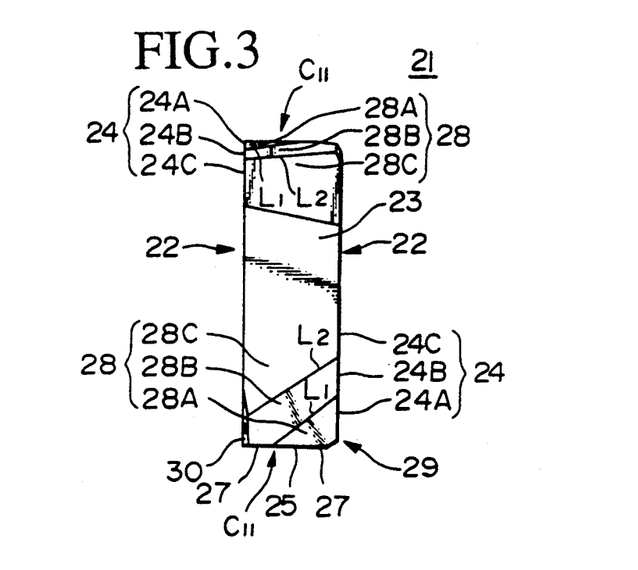
FIG. 3 is a side elevational view of the insert of FIG. 1 as seen from one peripheral surface 23 of the insert.
Figure 4:
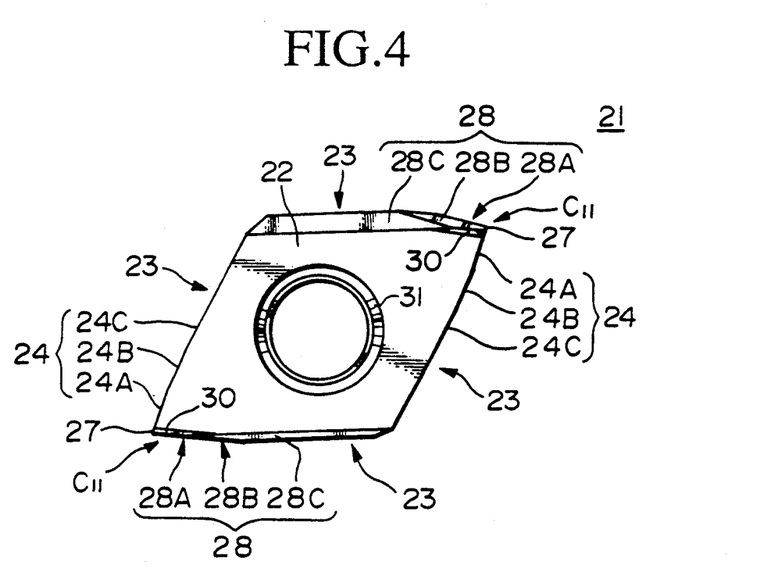
FIG. 4 is a plan view of the insert of FIG. 1, as seen along one auxiliary cutting edge 27 of the insert.
Figure 5:
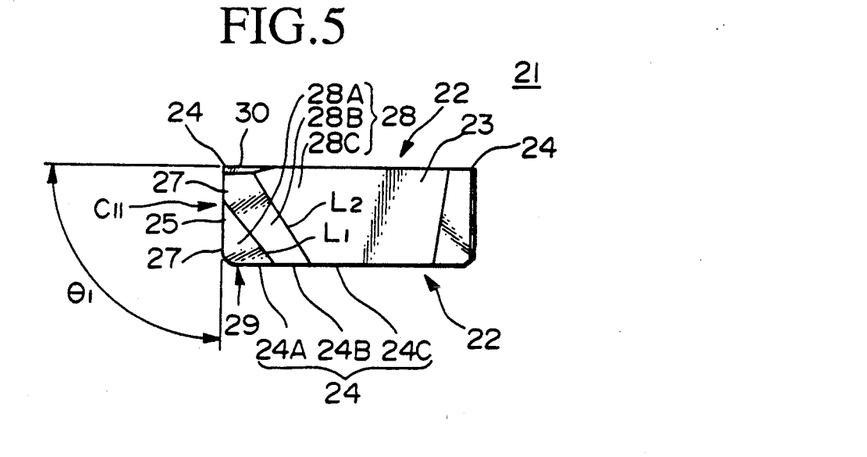
FIG. 5 is a side elevational view of the insert of FIG. 1, as seen along one of first main cutting edges 24A of the insert.
Figure 6:
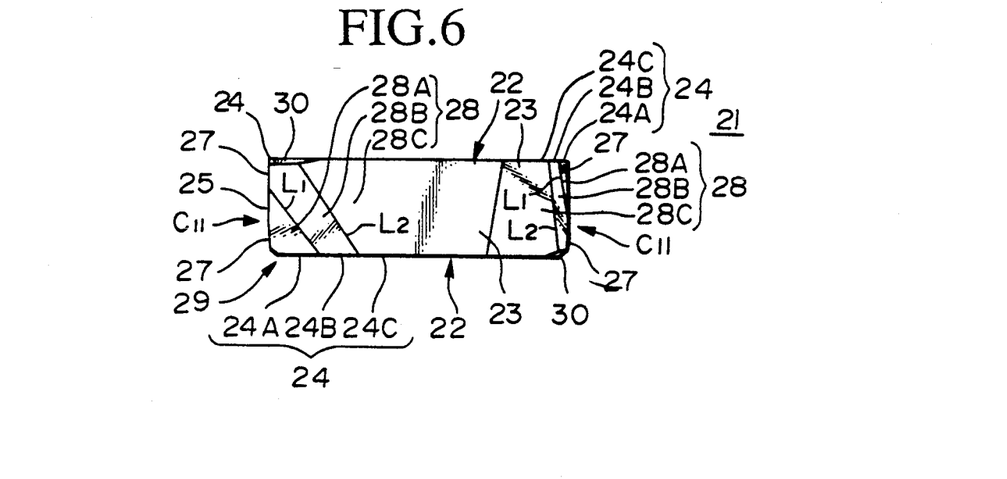
FIG. 6 is a side elevational view of the insert of FIG. 1 as seen from the other peripheral surface 23 of the insert.
Figure 7:
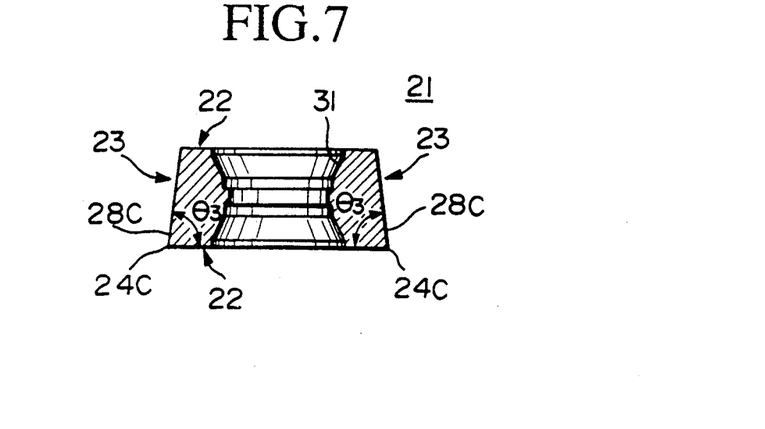
FIG. 7 is a cross-sectional view of the insert of FIG. 1, taken along the line VII—VII in FIG. 2.
Figure 8:
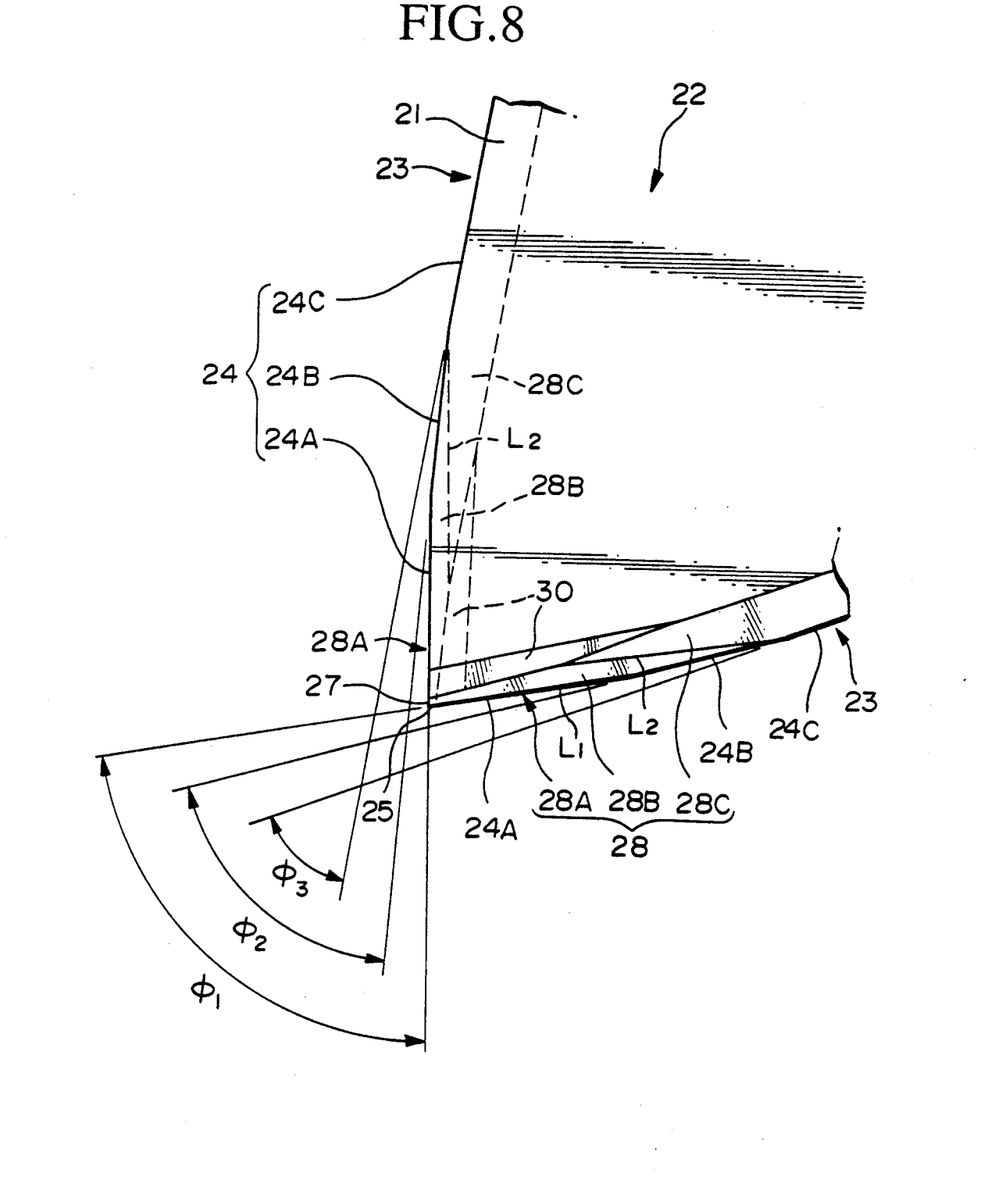
FIG. 8 is an enlarged view of one of acute corner portions C11 of the insert of FIG. 1.
Figure 9:
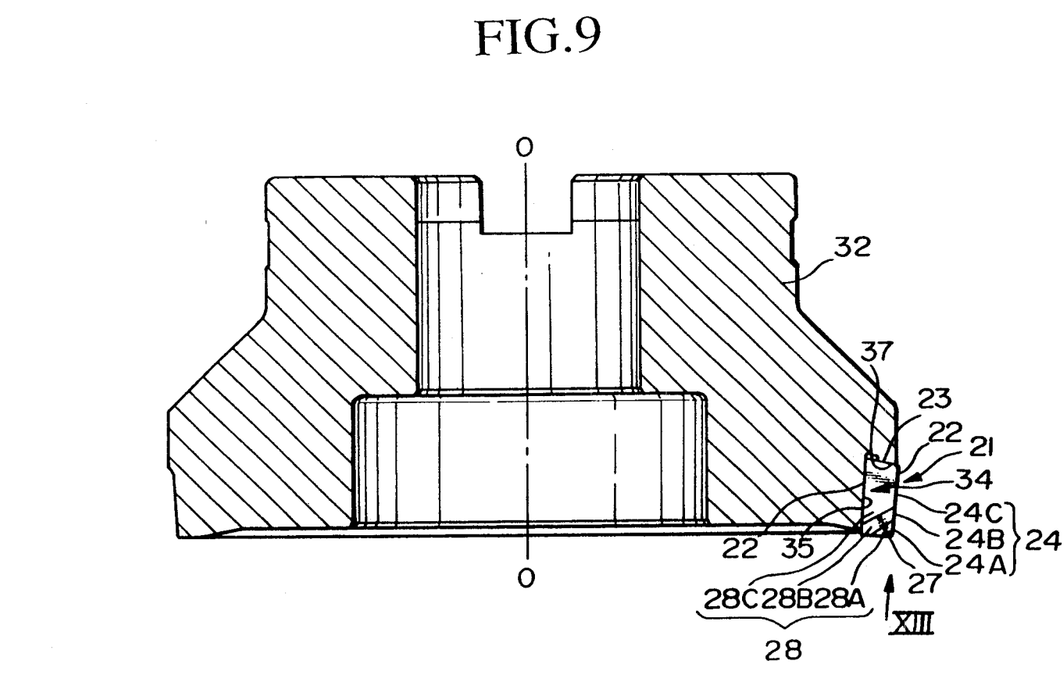
FIG. 9 is a cross-sectional view of a face milling cutter to which the insert of FIG. 1 is attached.

Furthermore, in FIG. 8, the two main cutting edges 24 and 24 formed at the acute corner portion $C_{11}$ are extended to provide extended lines: these extended lines project in the direction of insert thickness. The angles indicated by $\Phi$ in FIG. 8 are the intersection angles of these projected lines. It should be noted that the main cutting edges 24 and 24 do not actually intersect each other since they are formed on the marginal edges of the faces 22 and 22 which are parallel to each other.

In FIG. 8, the characters $\Phi_1$, $\Phi_2$ and $\Phi_3$ denote the intersection angle of the projected line of the extended line of the first cutting edge portion 24A, the intersection angle of the projected line of the extended line of the second cutting edge portion 24B, and the intersection angle of the projected line of the extended line of the third cutting edge portion 24C, respectively. In this embodiment, inasmuch as the first, second and third cutting edge portions 24A, 24B and 24C are kinked convexly to constitute the main cutting edge 24, the above intersecting angles have the relationship of $\Phi_1 > \Phi_2 > \Phi_3$.

In the illustrated specific embodiment, the angles $\Phi_1$, $\Phi_2$, and $\Phi_3$ are set to 80°, 69.9°, and 60°, respectively.

The cutting insert thus constructed is attached to a cutting tool such as a face milling cutter as shown for example in FIGS. 9 to 15, for use in cutting operations.

As will be seen from FIGS. 9 to 15, the face milling cutter includes a tool body 32 of a circular cross-section having an axis of rotation O therethrough, and having a reduced diameter portion at its rearward side. The tool body 32 includes a forward end portion having a plurality of chip pockets 33 formed in an outer peripheral surface thereof, in circumferentially spaced relation to one another, so as to open to a forward end face and the outer peripheral surface thereof. Furthermore, an insert-receiving recess or seat 34A or 34B, opening to the outer peripheral surface and forward end face of the tool body 32 and the chip pocket 33, is formed on the face of a respective one of the chip pockets 33 which faces in the direction of rotation T of the tool body. Each insert-receiving recess 34A or 34B defines a bottom face 35 directed radially outwardly of the tool body 32, wall portions 36 and 37 extending vertically from the bottom face 35 to the outer peripheral surface of the tool body 32 and facing in the direction of rotation T and in an axially forward direction, respectively. Furthermore, a threaded hole 39, into which the clamp screw 38 which is inserted through the mounting aperture 31 of the insert body 21 is threaded, is formed in the bottom face 35 so as to be perpendicular thereto.

Figure 10:
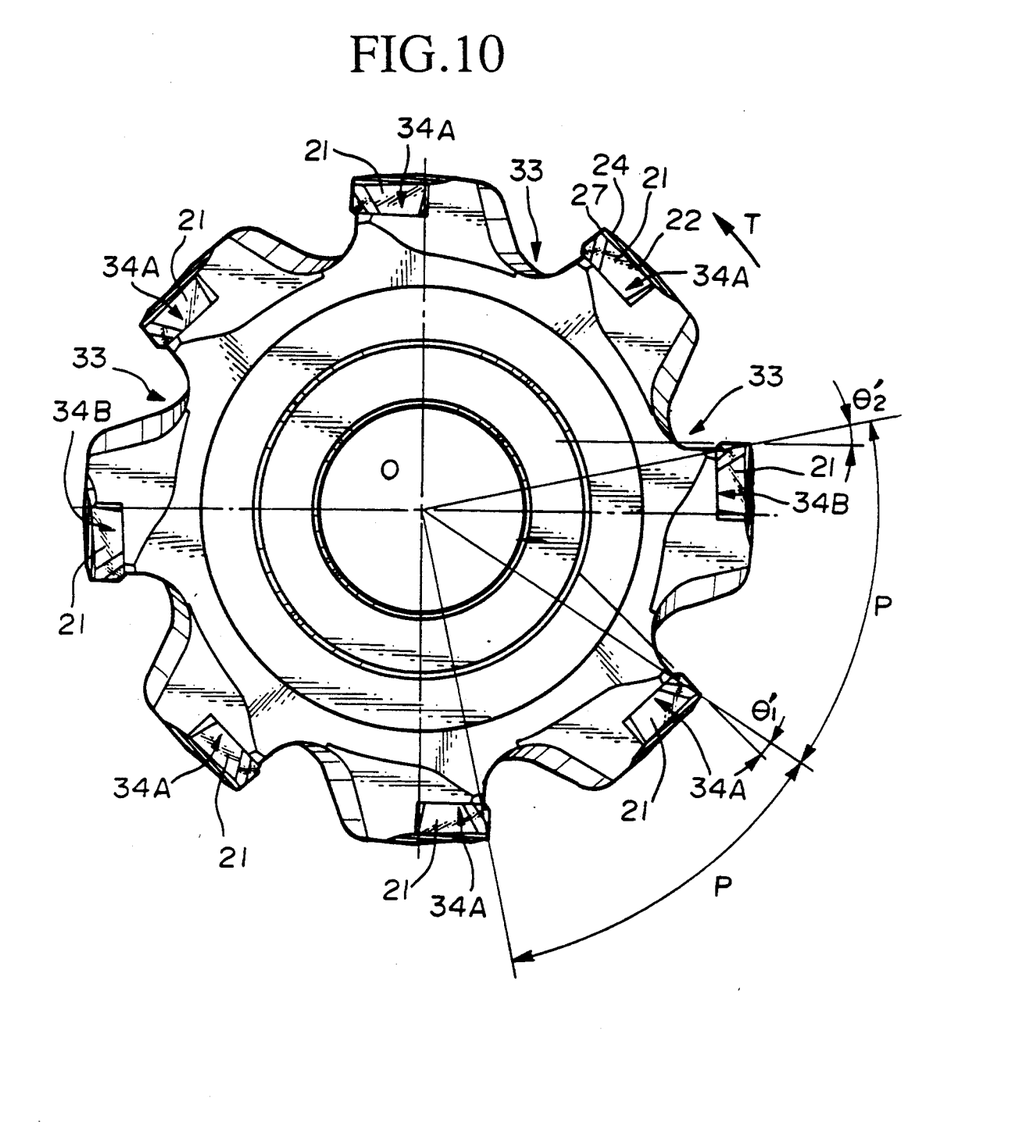
FIG. 10 is a front end view of the face milling cutter of FIG. 9.

Thus, the insert of the present embodiment is received in and secured to the insert receiving recess 34 such that one of the opposite faces 22 and 22 is directed in a radially outward direction with respect to the tool body, that the other face 22 is mated with the bottom face 35 of the insert receiving recess 34A or 34B, and that the two peripheral faces 23 and 23 intersecting each other at one of the corner portions $C_{11}$ are held in abutment with the wall portions 36 and 37. Thus, even though the inserts 21 are of an identical shape, the insert 21 received on the bottom face 35 of the insert receiving recess 34A serves as a coarse cutting insert which cuts a vertical face with its main cutting edge, whereas the insert 21 received on the bottom face 35 of the insert receiving recess 34B serves as a finishing cutting insert which cuts a horizontal face with its auxiliary cutting edge. In FIG. 10, the opposite pair of the inserts 21 disposed at positions corresponding to 3 o'clock and 9 o'clock serve as finishing inserts, while the others serve as coarse cutting inserts.

As shown in FIG. 10, the insert receiving recesses 34A and 34B are arranged such that the circumferential distances P between the foremost ends of the cutting edges of the adjacent inserts are identical. Furthermore, the bottom face 35 of the insert receiving recess 34A on which the coarse cutting insert is received, and the bottom face 35 of the insert receiving recess 34B on which the finish cutting insert is received are arranged so as to satisfy the following relationship:

$$\theta'_1 < \theta'_2$$

where $\theta'_1$ and $\theta'_2$ denote angles defined between a line connecting the axis O of the tool body and the radially outermost portion of the cutting edge, and a line including the marginal ridge of the auxiliary cutting edge 27, respectively.

More specifically, with the above construction of the insert receiving recesses, the radial rake angle for the insert to be used for coarse cutting (designated by 21A) becomes greater in the positive direction than that for the insert to be used for finishing cutting (designated by 21B). Accordingly, the cutting performance for the coarse cutting can be improved.

Figure 11:
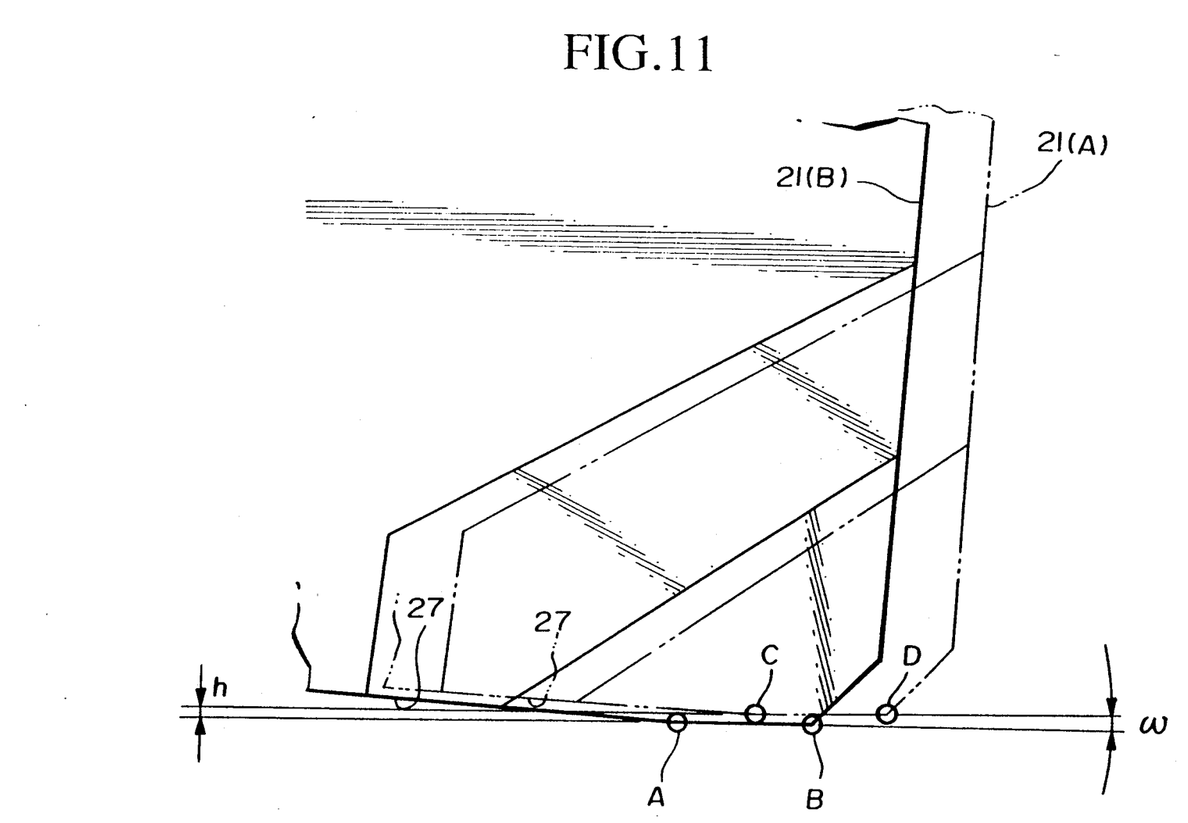
FIG. 11 is an enlarged view of the cutting edges of the face milling cutter of FIG. 9 as viewed from the end face of the tool body.
Figure 12:
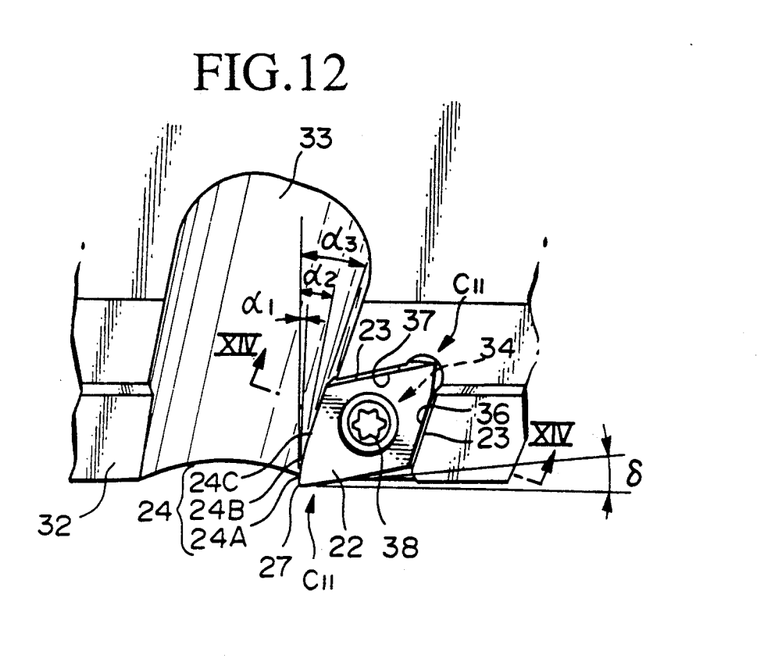
FIG. 12 is a side-elevational view of the face milling cutter of FIG. 9, showing a part around an insert-receiving recess 34.
Figure 13:
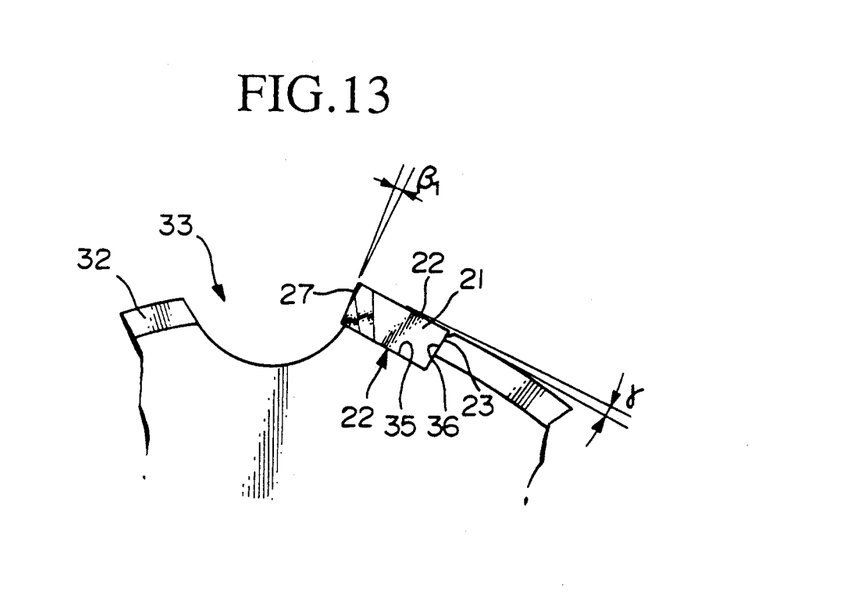
FIG. 13 is a view of the face milling cutter of FIG. 9, as seen in the direction indicated by the arrow XIII in FIG. 9.
Figure 14:
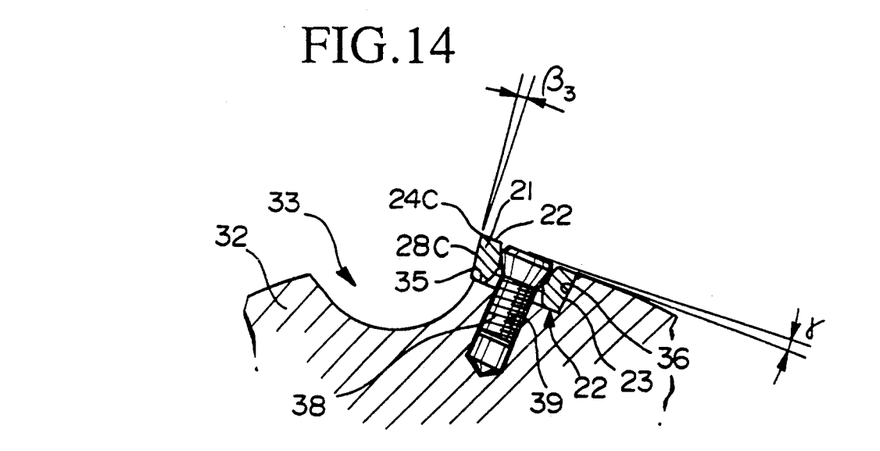
FIG. 14 is a cross-sectional view of the insert-receiving recess taken along the line XIV—XIV in FIG. 12.
Figure 15:
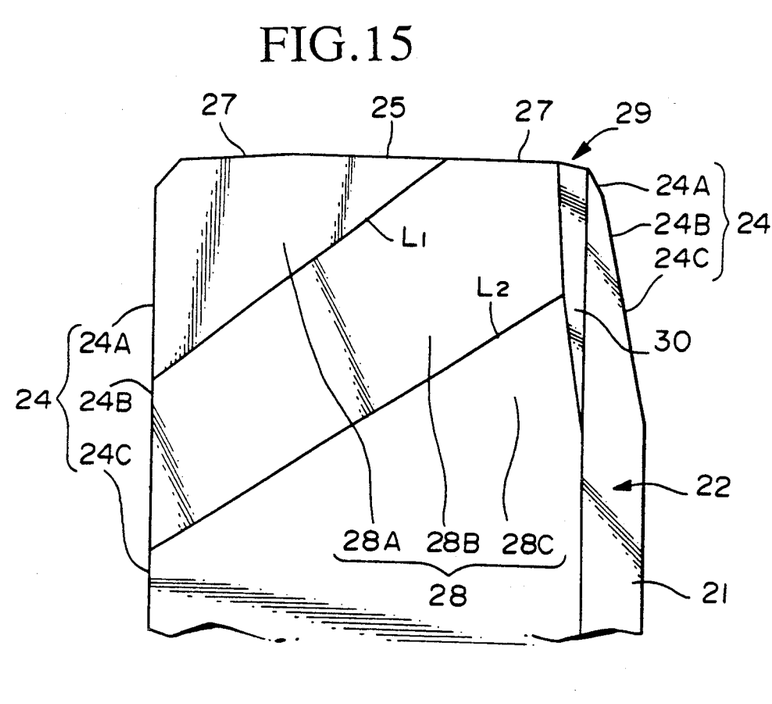
FIG. 15 is an enlarged view of the acute corner portion C11 of the insert.

Moreover, in the above face milling cutter, the bottom face 35 of the insert receiving recess 34A for the coarse cutting insert 21A is set so that the radial rake angle is in the positive side. Therefore, the outer portion (the portion between point C and point D in FIG. 11) of the auxiliary cutting edge 27 of the insert 21A received by the recess 34A protrudes with respect to the outer portion (the portion between point A and point B in FIG. 11) of the auxiliary cutting edge 27 of the insert 21B received by the recess 34B, and is brought into engagement with the face cut by the auxiliary cutting edge 27 of the finishing insert 21B. Accordingly, as shown in FIG. 11, the position of the insert receiving recess 34A for the coarse cutting insert 21A is shifted a height h corresponding to the protruded amount ω in an axially rearward direction of the tool body. Specifically, the wall 37 of the insert receiving recess 34A for the coarse cutting insert is shifted h in the axially rearward direction of the tool body.

With the above construction, the bottom face to be cut can be cut only by the finishing insert.

In the illustrated embodiment, by changing the angles of the bottom faces 35 of the insert receiving recesses 34A and 34B, the radial rake angle of the coarse cutting insert 21A is increased in the positive side while keeping the distance between the coarse cutting insert and the finish cutting insert (the circumferential distance between the foremost ends of the cutting edges) uniform. However, the position of the coarse cutting insert may be shifted in a direction opposite to the direction of rotation of the tool body to thereby cause the radial rake angle of the coarse cutting insert in the positive side. In this case, since the position of the cutting edge of the coarse cutting insert is shifted further from the cutting edge of the adjacent finishing insert, the distances therebetween vary.

In the foregoing, the insert body 21 is arranged such that, among the peripheral faces 23 and 23 intersecting each other at acute corner portion $C_{11}$ located in opposite relation to the corner portion $C_{11}$ where the peripheral faces 23 and 23 held in abutment with the walls 36 and 37 of the insert-receiving recess intersect each other, one of the peripheral faces 23 is directed in a direction of rotation T of the tool body whereas the other peripheral face 23 is directed axially forwardly of the tool body, and that the main cutting edge 24 and the auxiliary cutting edge 24, disposed adjacent to the rake region 28 formed on the aforesaid one peripheral face 23, protrude from the outer peripheral surface and the forward end face of the tool body 32.

Thus, as the clamp screw 38 is inserted through the mounting aperture 31 of the insert body 21 into the internally threaded aperture 39 and is tightened, the insert body 21 is secured to the insert-receiving recess 34. More specifically, as is the case with the prior art cutting insert, one of the opposite faces 22 and 22 of the insert of the present embodiment is selected as a seating face to be seated on the bottom face of the insert receiving recess, and hence one of the main cutting edges 24 and 24 formed on the other face 22 may be selectively indexed in an active cutting position.

When securing the insert to the tool body, a prescribed radial relief angle γ is imparted to the aforesaid one face 22, and with respect to one of the rake regions 28 which is formed on the peripheral face 23 directed toward the chip pocket 33, positive axial rake angles $\alpha_1$, $\alpha_2$ and $\alpha_3$ and positive radial rake angles $\beta_1$, $\beta_2$ and $\beta_3$ are provided for first section 28A, second section 28B and third section 28C, respectively.

Furthermore, a prescribed positive relief angle δ is provided for the other rake region 28 which is formed on the other peripheral face 23 directed axially forwardly of the tool body and extends from the auxiliary cutting edge 27 protruding from the forward end face of the tool body 32.

In the foregoing, as best shown in FIG. 11, the axial rake angles $\alpha_1$, $\alpha_2$, and $\alpha_3$ provided for first, second and third sections 28A, 28B, and 28C of the one rake region 28 are increased stepwise in the positive direction as they approach from first section 28A via second section 28B to third section 28C since the sections 28A, 28B, and 28C are convexly bent in a peripheral direction of the insert body 21. More specifically, there is the relationship of $\alpha_1 < \alpha_2 < \alpha_3$ among the axial rake angles $\alpha_1$, $\alpha_2$, and $\alpha_3$. Furthermore, as long as the radial relief angle δ is constant, the radial rake angles $\beta_1$, $\beta_2$, and $\beta_3$, given to the first, second and third sections 28A, 28B, and 28C of the one rake region 28, are also increased stepwise in the positive direction as they approach from the first section 28A through the second section 28B to the third section 28C since the intersection angles $\theta_1$, $\theta_2$, and $\theta_3$ between the sections 28A, 28B, and 28C and the other face 22 are formed so as to decrease the further they are away from the nose portion 29. This construction will be seen in FIGS. 12 and 13 (in the FIGS. $\beta_2$ is omitted). More specifically, there is the relationship of $\beta_1 < \beta_2 < \beta_3$ among the radial rake angles $\beta_1$, $\beta_2$, and $\beta_3$.

Accordingly, when the apex angle of the insert body 21 at the acute corner portion $C_{11}$ (i.e., the intersection angle $\Phi_1$ defined between the main cutting edge portions 24A and 24A), is set to the same value as in the conventional insert, the axial rake angles $\alpha_2$ and $\alpha_3$ for the second and third sections 28B and 28C both become great in the positive direction, and increase at the axially rearward side of the tool.

On the other hand, when the radial relief angle γ is set identical, the radial rake angle $\beta_1$ for the first section 28A remains unchanged since the intersection angle $\theta_1$ between the first section 28A and the other face 22 is set to 90°. However, in the insert of this embodiment, the intersection angles θ are formed so as to decrease stepwise from the first section 28A through the second section 28B to the third section 28C as they approach from the nose portion 29 toward the axially rearward side of the tool. Therefore, the radial rake angles $\beta_2$ and $\beta_3$ are both greater than the prior art insert, increasing at the section on the axial rearward side.

Accordingly, with respect to the main cutting edge 24, its cutting performance is gradually improved in the order from the first cutting edge portion 24A through the second cutting edge portion 24B to the third cutting edge portion 24C. Thus, the cutting load exerted on the entire main cutting edge 24 is reduced in comparison with the prior art insert, so that the power required for the cutting operation can be saved.

On the other hand, at the leading portion disposed at the axially forward portion of the tool body, the first section 28A, extending from the main cutting edge portion 24A, is formed as a negative rake surface such that the intersection angle $\theta_1$ between the first section 28A and the one face 22 is 90°. Accordingly, the same degree of the included angle as in the prior art insert can be ensured. Furthermore, as described above, the intersection angle $\phi_1$ of the first main cutting edges 24A and 24A is set identical to the apex angle at the acute corner of the prior art insert. Therefore, the same included angle as in the prior art insert can be ensured as to the auxiliary cutting edge 27. Consequently, at the cutting edge at the axially forward side of the tool onto which the largest cutting load is exerted during the cutting operation, the same included angle as in the prior art cutting insert can be provided for both of the main cutting edge 24 and the auxiliary cutting edge 27. Therefore, sufficient strength at the cutting edge can be ensured against the load exerted during the cutting operation.

As described above, when the insert of the invention is secured to a cutting tool such as a face milling cutter and is used for the cutting operation, sufficient strength against the load exerted thereon can be maintained, and additionally excellent cutting performance can be ensured over the entire cutting edge. For this reason, the cutting resistance can be reduced while preventing chipping of the insert in advance, and enhancement of the cutting performance can be attained.

Furthermore, according to the cutting insert of the illustrated embodiment, the rake region 28 is formed into step-like faces defined by three sections 28A, 28B and 28C, and hence the rake surface 28 is discontinuous at the first and second marginal edges $L_1$ and $L_2$. Therefore, the cutting chips moving along the rake region 28 during growth are brought into frictional engagement with the marginal edges $L_1$ and $L_2$ to be bent and broken. Thus, since the cutting chips can be efficiently removed, the cutting load can be reduced, resulting in further enhancement of the cutting performance.

Furthermore, in the cutting insert as described above, the auxiliary cutting edge 27 extending along the one rake region 28 is terminated such that its inner end in the direction of the insert thickness is specified by the other end which terminates at the marginal edge 25 of the first marginal edge $L_1$ formed on the other rake region 28. Accordingly, when the insert of the present embodiment is secured to the tool body 32 such as a face milling cutter as shown in FIGS. 9 to 14, the second section 28B and the third section 28C extending from the first marginal edge $L_1$ of the other rake region 28 serve as the auxiliary relief surface for the auxiliary cutting edge 27.

In the foregoing, since the sections 28B and 28C are also formed into step-like faces which are convexly bent stepwise, the relief angle $\delta$ increases stepwise from the second section 28B located at the axially forward side of the tool body, toward the third section 28C, located at the axially rearward side thereof.

Accordingly, in the case where the intersecting angle $\phi_1$ of the first main cutting edge portions 24A and 24A is set identical to the apex angle at the acute corner of the prior art insert, the relief angle $\delta$ at the axially rearward side of the tool body can be made large enough in comparison with the prior art insert, and hence a smooth cutting operation can be ensured. In contrast, in the case where the relief angle $\delta$ is identical to that of the prior art insert, the intersection angle $\phi_1$ of the first main cutting edge portions 24A and 24A can be made large. As a result, the included angle of the auxiliary cutting edge 27 can be made large, so that the strength at the cutting edge can be enhanced and chipping can be prevented.

Moreover, in the case where the cutting insert constructed as described above is secured to a tool such as a face milling cutter in such a manner that, as shown in FIGS. 9 to 14, or FIG. 18, a positive axial rake angle is imparted to the main cutting edge of the insert while a radial rake angle is imparted to the face directed in an outward direction with respect to the tool body, the opposite end portions of the main cutting edge are caused to be slightly protruded in a radially outward manner from the central portion of the tool body. For this reason, the locus of the main cutting edge produced by the rotation of the tool body, does not define a complete cylindrical plane, but is slightly deformed into a convexly arcuate shape.

However, in the cutting insert of the above construction, the main cutting edge 24 is defined by the first cutting edge portion 24A, the second cutting edge portion 24B and the third cutting edge portion 24C, and is bent in a convexly stepwise form. Therefore, when the insert is secured to the tool body, the central portion of the main cutting edge is caused to protrude in a radially outward direction relative to the opposite end portions thereof. With this construction, the protrusion of the opposite ends of the main cutting edge can be diminished, and the locus of the main cutting edge generated by the rotation approaches a genuine cylindrical plane. Accordingly, the cutting precision can be improved.

Furthermore, the insert cutter which comprises the aforesaid inserts may preferably be constructed so as to have both coarse cutting inserts and finish cutting inserts, and the cutting performance of the coarse cutting inserts can be substantially improved by forming the insert receiving recesses for the coarse cutting inserts in a different way from those for the finish cutting inserts.

Obviously, many modifications and variations of the present invention are possible in the light of the above teachings. For example, although in the above embodiment, the insert body 21 is shaped into a rhombic plate and the main cutting edges 24 are formed alternately on the marginal edge of the opposite faces in a staggered manner, the present invention is not limited to this specific construction. Namely, one of the opposite faces 22 and 22 may be limited as being seated on the bottom face of the insert receiving recess. It is also possible to modify the shape of the insert body 21 to that of a square, a parallelogram or a triangle. Moreover, in the above embodiment, the rake region 28 formed on the peripheral face 23 is defined by three sections 28A, 28B and 28C. However, it may be defined by two sections, or more than four sections as well.

What is claimed is:

1. A cutting insert comprising a polygonal plate-shaped insert body including two opposite faces directed in a direction of insert thickness and a plurality of peripheral faces disposed between said opposite faces, said opposite faces having marginal edges with at least one of said marginal edges defining a main cutting edge, said peripheral faces intersecting one another to form marginal edges with at least one of said marginal edges defining an auxiliary cutting edge which intersects said main cutting edge, a peripheral face which intersects the marginal edges defining said main and auxiliary cutting edges including a rake region extending along said main and auxiliary cutting edges, said insert body having a nose portion into which said main cutting edge and said auxiliary cutting edge merge;

said rake region comprising a plurality of sections, each said section being disposed in a plane different from another section, said sections intersecting one another to define marginal edges at intersections thereof and terminating at one end at said main cutting edge, said rake region being convexly shaped in such a manner that an included angle defined by a respective section and one of said opposite faces which extends from said main cutting edge decreases with distance from said nose portion, at least one of said marginal edges of said sections having the other end extending to a marginal edge defined between said peripheral faces.

2. A cutting insert as recited in claim 1, wherein the marginal edges of said opposite faces of said insert body disposed alternately to one another along a periphery of the insert define a plurality of said main cutting edges, adjacent peripheral faces intersecting each other at one end at an acute angle to define respective auxiliary cutting edges at the intersection, each auxiliary cutting edge extending from a respective main cutting edge, each peripheral face having first and second rake regions adjacent to said intersection, said other end of said at least one marginal edge of said sections formed on said first rake region defining a distal end of the auxiliary cutting edge disposed away from the associated main cutting edge which is associated with said second rake region, at least one of said sections defined on said first rake region being adapted to serve as an auxiliary relief surface for the auxiliary cutting edge associated with the second rake region.

3. A cutting insert as recited in claim 2, wherein said plurality of sections of said first surface includes a first section extending immediately from said nose portion, and a second section intersecting said first section to provide at least one marginal ridge having said other end, said second section serving as said auxiliary relief surface for the auxiliary cutting edge associated with the second surface.

4. A cutting insert as recited in claim 3, wherein said first section of said first surface extending immediately from said nose portion is constructed and arranged such that an angle defined by said first section and one of said opposite faces extending immediately from said main cutting edge is 90°.

5. An insert cutter comprising:
   a tool body having an axis of rotation therethrough; and
   a cutting insert including a polygonal plate-shaped insert body having two opposite faces directed in a direction of insert thickness and a plurality of peripheral faces disposed between said opposite faces, said insert being releasably attached to said tool body so that said opposite faces are directed radially of said tool body, said opposite faces having marginal edges with at least one of said marginal edges defining a main cutting edge, said peripheral faces intersecting one another to from marginal edges with at least one of said marginal edges defining an auxiliary cutting edge which intersects said main cutting edge, a peripheral face which intersects the marginal edges defining said main and auxiliary cutting edges including a rake region extending along said main and auxiliary cutting edges, said insert body having a nose portion into which said main cutting edge and said auxiliary cutting edge merge, said rake region comprising a plurality of sections, each said section being disposed in a plane different from another section, said sections intersecting one another to define marginal edges at intersections thereof and terminating at one end at said main cutting edge, said rake region being convexly shaped in such a manner that an included angle defined by a respective section and one of said opposite faces which extends from said main cutting edge decreases with distance from said nose portion, at least one of said marginal edges of said sections having the other end extending to a marginal edge defined between said peripheral faces.

6. An insert cutter as recited in claim 5, wherein said tool body includes a plurality of insert receiving recesses formed therein in circumferentially spaced relation to one another, said cutter comprising a plurality of said cutting inserts accommodated in said insert receiving recesses, respectively, said inserts being grouped into a first group of at least one coarse cutting insert and a second group of at least one finish cutting insert, each insert receiving recess having a bottom face on which one of the opposite faces of said insert is held in contact and a wall facing in a direction of rotation of said tool body and supporting one of the peripheral faces of said insert.

7. An insert cutter as recited in claim 6, wherein the insert receiving recess for the insert of the first group and the insert receiving recess for the insert of the second group are constructed so that an angle defined between the bottom face of the insert receiving recess and a line connecting said axis of said tool body and a radially outermost portion of the cutting edge of each insert is different from each other.

8. An insert cutter as recited in claim 6, wherein the position of the insert in an axial direction of said tool body is different between the insert of said first group and the insert of said second group.

* * * * *